A. M. HIRSH & T. L. McLENON.
JOINT FOR CONCRETE PIPES.
APPLICATION FILED FEB. 5, 1916.
1,216,317.
Patented Feb. 20, 1917.
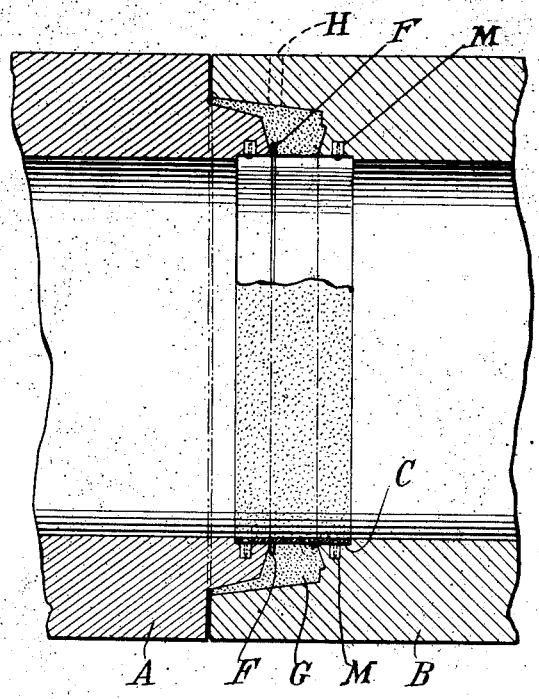
Fig. 1.
Fig. 2.
Fig. 3.
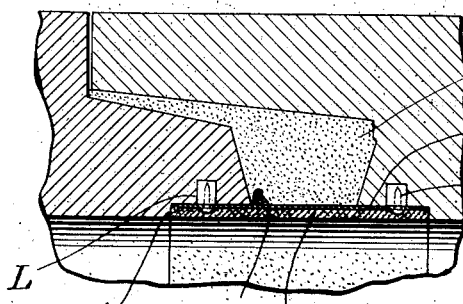
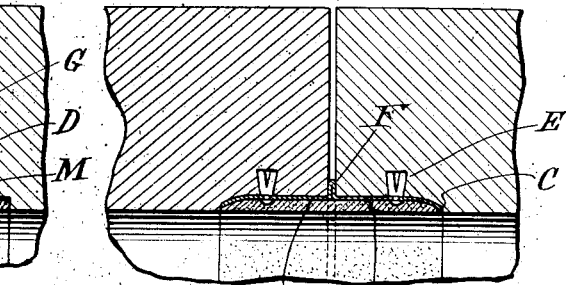
Fig. 4.
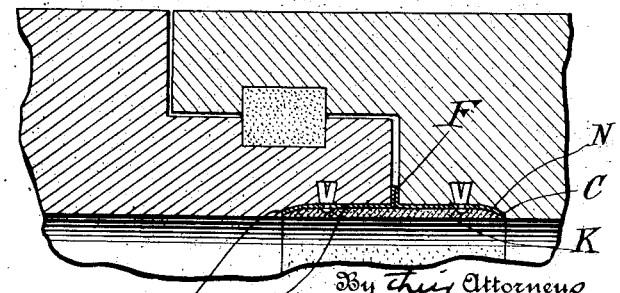
A. M. Hirsh
T. L. McLenon
Inventors
By their Attorneys
Kerr, Page, Cooper & Hayward

UNITED STATES PATENT OFFICE.

ALLAN M. HIRSH, OF MONTCLAIR, AND THOMAS L. McLENON, OF EAST ORANGE, NEW JERSEY; SAID McLENON ASSIGNOR OF ONE-HALF OF THE WHOLE RIGHT TO LOCK JOINT PIPE COMPANY, OF AMPERE, NEW JERSEY, A CORPORATION OF NEW JERSEY.

JOINT FOR CONCRETE PIPES.

1,216,317.      Specification of Letters Patent.      Patented Feb. 20, 1917.

Application filed February 5, 1916. Serial No. 76,279.

*To all whom it may concern:*

Be it known that we, ALLAN M. HIRSH and THOMAS L. McLENON, both citizens of the United States, residing respectively at Montclair and East Orange, in the county of Essex and State of New Jersey, have invented certain new and useful Improvements in Joints for Concrete Pipes, of which the following is a full, clear, and exact description.

In a patent granted to Meriwether, Mitchell and Hirsh, No. 1,151,949, dated August 31, 1915, there is shown a joint for concrete pressure pipes, in which a recess, formed at the junction of each two adjacent pipe sections and extending over a portion of the joint between abutting sections, is filled with a plastic material such as cement, and the joint thus formed, which is watertight only until the cement filler becomes cracked, is made absolutely tight by the employment of a sheet or cylinder of flexible expansible metal, incorporated in the end of one pipe section and extending into and embedded in the filler of plastic material.

In this device the sheet metal strip or cylinder, in order to meet the requirements of practical use in a joint which is subject to expansion and contraction from variations in temperature, displacement of pipe sections and other causes as well, is formed with a crimp or folded portion lying along the end of the spigot section, and both edges of the metal sheet are provided with folded or similar portions to serve as anchors in the molded body of concrete and the cement filler respectively.

This forms a joint for concrete pressure pipes of the most exceptional efficiency and value, but its applicability is somewhat limited in the form in which it is shown in the patent in question to pipes, if not altogether of certain form, at least manufactured in a certain manner.

In efforts to devise a form of perfectly watertight joint that may not only be applied to any form of pipe section, but to sections already manufactured by any process without regard to this special improvement, or which have been actually laid without the metal cylinders at the joint, we have produced the form of joint upon which this application is based and which is distinguished by characteristics which we shall first generally explain and subsequently specifically define and claim.

Taking, for purposes of illustration, the special form of pipe shown in the patent above referred to, the pipe is composed of molded sections with a spigot at one end and a bell at the other. The outside flange of the bell end is made somewhat longer than the inside flange of the spigot, so that when two sections are assembled a space or recess will be formed across a portion of the joining surface, between the body of the pipe and the end of the spigot, which is then filled in with a plastic composition, such as cement to close and seal the pipe.

We propose now to form and unite such pipes in the usual manner, but preferably to form at each edge of the interior recess a shallow shoulder or depression in each section. We then lay in this depression in joining two sections a copper cylinder with a fold or crimp therein that preferably lies along the edge of the spigot end, and by suitable means, as by expansion bolts let into holes drilled in the body of the sections or other suitable means, we secure to the ends of abutting sections the copper cylinder.

We prefer although this is not essential, to coat the inner surface of the cylinder with pitch or a similar substance, so that it will adhere to the surface of the pipe sections, and to then fill the recess at the joint outside the sheet copper with grout or soft cement introduced through a hole in the pipe in any well known way.

While it is not absolutely essential, we then fill the depression in which the copper cylinder lies up to the level of the interior of the pipe with very finely sifted neat cement in a plastic condition, using for this purpose any suitable appliances, such as a trowel handled by a workman inside the pipe.

There is thus formed a joint with a seam therein which contains a filler of cement between which and the interior of the pipe is an expansible copper cylinder firmly united to the inside edges of each section. When cracks occur in this joint they invariably lie along the surfaces of the original sections at either one or the other or both sides of the joint, and do not extend through the body of the cement filler, so that the provision of the copper cylinder effectually and perfectly prevents leakage at the joints through such cracks.

The specific construction of the joint, and the principles underlying its application to this and other forms of joint, are illustrated in the accompanying drawing, in which—

Figure 1 is a sectional view of two abutting pipe sections, joined in accordance with our present improvements.

Fig. 2 is an enlarged sectional view of a modified form of joint.

Fig. 3 is a sectional view of another form of joint to which the invention is applicable, and Fig. 4 is a sectional view of still another form of joint with which the invention may be used.

Referring to Figs. 1 and 2, A and B are respectively the spigot and bell ends of two abutting sections of molded concrete pipes. The spigot is shorter than the bell so that when the sections are put together a recess is formed at the joint.

Along each edge of this recess we form in the ends of the pipe sections shoulders or cut away portions C, so that the recess opens into a depression and not, as customarily, directly into the interior of the pipe.

When two pipe sections are brought together we place in this depression a sheet metal, preferably copper, cylinder D containing a series of perforations along each edge, by means of which it is firmly united to the ends of the sections as by expansion bolts E inserted in holes drilled into the said sections. Usually, the surfaces of the shoulders, or the exterior of the copper cylinder, is coated with pitch or a similar material to make a tight joint between the same and the pipe sections, and in the cylinder, preferably along a line close to the end of the spigot end, is a crimp or folded portion F, to provide for a certain amount of expansion.

After the cylinder has been secured in place the recess which it covers is then filled with grout or cement G, this being generally introduced through a hole H at or near the top of the pipe, and we then preferably cover the cylinder and fill the depression in which it lies, up to the level of the inner surface of the pipe with finely sifted neat cement K. Instead of using expansible bolts as the means for securing the copper cylinder to the ends of the sections, we may form, as in the process of molding, grooves L in the opposite sections, and drive wooden strips M into the same. The cylinders are then nailed to these strips by copper nails, which not only makes a more convenient means of fastening the cylinders, but should any moisture leak through the joint the wooden strips swell and contribute to making a tighter joint.

In Fig. 3 two abutting sections of pipe having ordinary butt joints are shown, and each section, along the line of union on the inside of the pipe, is cut way, so that a depression is formed in which, as in the previous case, a copper cylinder is laid, which, in this case, has the crimp along its central part so that it extends into the narrow space between the ends of the sections.

When, in this case, the cylinder has been placed and secured over the joint, the depression in which it lies is filled in with finely shifted or neat cement K to the level of the interior surface of the pipes. In this and preferably in all cases, the edges of the copper cylinder are slightly turned in as shown at N so that when the cement is applied, it may be forced or worked in under such edges, thus conducing to a better union and a tighter joint.

In Fig. 4 a form of bell and spigot joint, with an interior recess or cavity to be filled with cement K, is shown, but to this form of joint also the invention may be applied by securing the cylinder over the line of union of the two sections on the interior of the pipe, as described, in connection with Fig. 3.

As the means for securing the cylinder to the ends of the two pipe sections we have shown expansion bolts driven into holes in the sections or their equivalents, but any other means may be adapted for the same purpose, it being only desirable that a good tight joint between the copper and the concrete pipes be secured.

The invention, as will be understood from the foregoing, is applicable to many forms of joint and provides a most effective means of obtaining a permanently watertight joint in any such pipe, particularly those subjected to high internal pressure. The shoulders forming the depression for the cylinder may be formed by the molds when the pipe sections are made therein, or they may be subsequently chiseled out at any time after the sections have hardened or after they have been laid.

What we claim is:

1. A water-tight joint for concrete pressure pipes, comprising a cement filled or luted space between the sections of said pipe, and a cylinder of sheet metal with a crimp or fold therein to render it longitudinally expansible, the said cylinder being united to shoulders on the abutting sections over the line of union, with the crimp therein lying against one of the abutting pipe surfaces and embedded in the cement filler.

2. A water tight joint for concrete pressure pipes, comprising a cement filled or luted space between the sections, a cylinder of sheet metal expansible longitudinally secured to shoulders in the abutting surfaces of the joint which form a recess in the ends of said sections and a filling of finely sifted neat cement applied in such recess over the sheet metal cylinder, whereby the latter is embedded in the cement forming the joint.

3. A water-tight joint for concrete pressure pipes, comprising a recess or widened space in the joint between abutting sections and containing a sealing filler of plastic material such as cement, and a cylinder of sheet metal made longitudinally expansible by the presence of a crimp, the said cylinder being secured to the faces of the shoulders forming the widened space and spanning the line of union of pipes with the crimp therein lying against a surface of the abutting sections and a filling of cement applied over the cylinder.

4. A water-tight joint for concrete pressure pipes, comprising a recess or widened space between the ends of abutting sections, formed by shoulders at said ends, a filling of plastic material, such as cement, between the ends of said abutting sections and a crimped cylinder of sheet metal secured to the shoulders and embedded in the cement filler and having its crimp in contact with one of the abutting surfaces of the pipe sections.

5. A watertight joint for concrete pressure pipes, comprising a recess or widened space at the inside of the joint between abutting sections, a filling of cement therefor, a depression formed by cutting away the inside edges of the two sections, a cylinder of sheet metal longitudinally expansible in said depression and united to the edges of the sections and a filling of finely sifted neat cement applied in the depression and over the sheet metal cylinder.

6. A joint for concrete pressure pipes comprising a cylinder of sheet metal having a circumferential crimp or fold to render it longitudinally expansible, the ends of said cylinder extending beyond the ends of abutting pipe sections and having the crimp in contact with one of the abutting surfaces of the pipe sections, and means for securing the ends of the said cylinder to shoulders in the abutting ends of the pipes.

7. A joint for concrete pressure pipes comprising a cement filled or luted space between the ends of abutting sections, strips of wood embedded in shoulders in the ends of the sections, and a cylinder of sheet metal, having a crimp therein which renders it longitudinally expansible, the ends of the cylinder being secured to the wooden strips with its crimp lying along one of the end surfaces of the abutting pipe sections.

8. A joint for concrete pressure pipes comprising wooden strips embedded in grooves in the faces of shoulders in the end walls of abutting sections and a metal cylinder with a circumferential crimp therein to render it longitudinally expansible, the ends of said cylinder being secured to the wooden strips with its crimp lying along one of the end surfaces of the abutting pipe sections.

9. A joint for concrete pressure pipes comprising a recess or widened space between abutting pipe sections, a cylinder of sheet metal having a circumferential crimp therein to render it longitudinally expansible, spanning such space with its crimp in contact with one of the end surfaces of the abutting pipe sections, means for securing its ends to shoulders in the ends of the sections and a filling of plastic material in the space between the sections and embedding the metal cylinder.

10. An expansible joint for concrete pressure pipes comprising a cylinder of metal having a circumferential crimp to render it longitudinally expansible, the ends of which cylinder extend beyond shoulders at the abutting pipe sections so that it spans the line of union with its crimp lying against an end surface of a section, means for attaching the cylinder to the faces of the shoulders, a backing of cement for the outside of the cylinder and a covering of plastic material over the inner surface of the same.

In testimony whereof we hereunto affix our signatures.

ALLAN M. HIRSH.
THOMAS L. McLENON.